June 14, 1966   R. M. REDWOOD, SR   3,256,454
DAMPER WINDING FOR D.C. SERIES MOTOR
Filed March 18, 1963
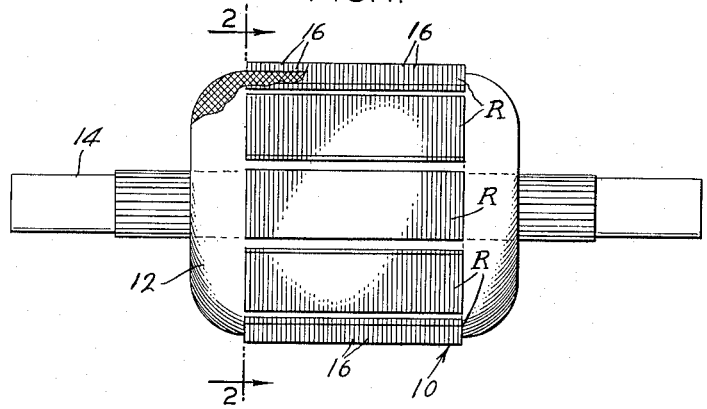
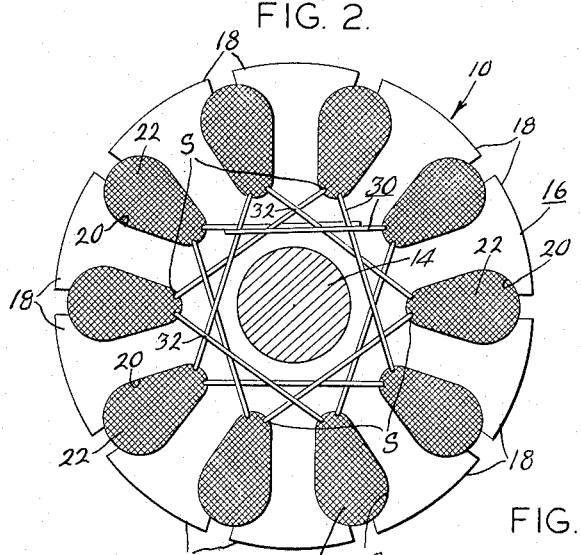
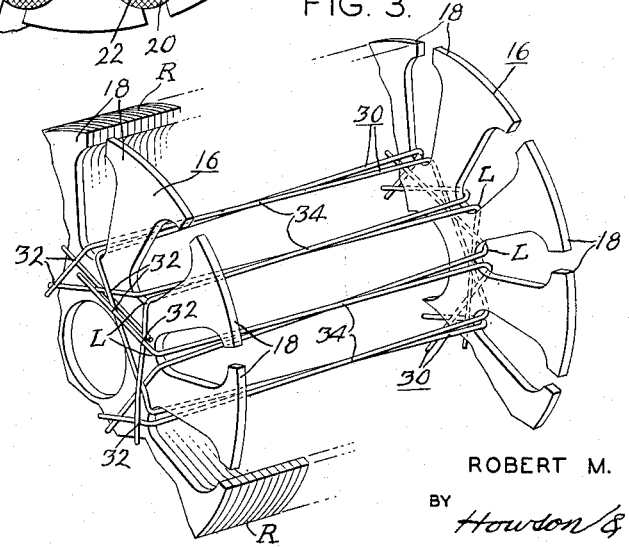
INVENTOR
ROBERT M. REDWOOD, SR.
BY
Howson & Howson
ATTYS.

United States Patent Office 3,256,454
Patented June 14, 1966

3,256,454
DAMPER WINDING FOR D.C. SERIES MOTOR
Robert Martin Redwood, Sr., Columbus, Miss., assignor to American Bosch Arma Corporation, Columbus, Miss., a corporation of New York
Filed Mar. 18, 1963, Ser. No. 265,678
4 Claims. (Cl. 310—183)

This invention relates to armatures for electric motor apparatus, such as direct current, series wound electric motor apparatus. More particularly, the present invention relates to new and improved armature means for controlling the speed characteristics of such apparatus in a manner to prevent "overspeeding" or "runaway" conditions when the motor is under comparatively light load or no load and to a method for making such improved armature means.

A well-known characteristic of direct current, series wound electric motors is that they possess a high stall or starting torque as compared, for example, to shunt or compound wound motors and accordingly they are often employed for example, in window lift and seat mover installations for automobiles or the like where the load on the motor may vary from a comparatively heavy starting load to a substantially no-load condition. A drawback of the series wound motor in these applications is that it tends to "overspeed" or "runaway" when the load on the motor is comparatively small. When running at excessively high speeds, the series motor tends to be noisy and in some instances there is the possibility of damage to the armature windings.

Various attempts have been made in the past to solve this problem of "runaway" in direct current series wound motors, but these proposals have not been entirely satisfactory. For example, one proposed solution to the problem consists in the use of mechanical means such as a spring or bowed washer engaging the armature shaft to provide a mechanical or friction load thereon. However, since the load imposed by the washer is present regardless of armature speed, it has the disadvantage of loading the armature at times when it is not needed and even not wanted, for example, during initial starting of the motor when high stall or starting torque is desired. In accordance with other attempts to solve the problem, it has been proposed to provide short-circuited armature windings. However, such armature assemblies of the prior art are comparatively expensive to manufacture and in some instances cut down on the overall performance of the motor and/or cause an unbalanced condition contributing to undue wear on the motor. In still other instances it has been proposed to wedge bars or strips of conducting material forcibly into each of the slots of the armature between the outer tips of the fingers on the rotor assembly of the armature and the armature windings. This assembly, however, is relatively expensive to manufacture.

The present invention provides a new and improved economical means of preventing "runaway" in electric motor apparatus. To this end the armature is provided with at least one short-circuited loop of wire which surrounds at least one of the rows of aligned fingers of the laminated core structure of the armature and which is positioned near the hub of the core structure between the armature windings and the bottom of the slots. In the illustrated embodiment of the invention, an elongated filamentary member such as a wire of a material having high electrical conductivity is wound on the core structure of the rotor assembly and crossed over itself at a point to provide a short-circuited turn or loop around at least one row of fingers. In the preferred form of the invention, the wire is wound about the core structure to provide a plurality of cross over points and loops surrounding each row of fingers, the armature windings serving to hold the wire in place and insure contact at the cross over points. By this arrangement, as the armature rotates in a magnetic field set up by the motor field windings, a current is induced in the short-circuited turns or loops setting up a magnetic field which opposes the magnetic field normally causing the armature to rotate. This induced current flow increases proportionally with increased armature speed and is of a sufficient magnitude at high armature speeds to prevent "runaway." Accordingly, an effective speed control of the armature is provided by the inducted magnetic field, the maximum control occurring at the higher speeds of the armature where the danger of "runaway" or "overspeeding" exists. Further the opposing magnetic field is minimal at the lower armature speeds thereby to preserve the high stall or starting characteristics of the motor.

In accordance with the present method for assembling the armature, a wire of high electrical conductivity is wound onto the core structure of the rotor assembly and crossed over at a point to provide at least one short-circuited turn around at least one of the rows of fingers of the core structure positioned in the bottom of the slots thereof adjacent the hub of the core structure and thereafter armature windings are wound onto the core structure over the short-circuited wire in a conventional manner. In accordance with the preferred method, the wire is wound about the core structure in a manner to provide a plurality of cross over points and a short-circuited loop around each row of fingers. It is noted that the short-circuited turn and armature windings may be applied with the same winding apparatus and accordingly this method of making the armature is extremely economical. Moreover, the armature windings serve to hold the short-circuited loop in place without the use of internal or external fastening means. Additionally, the short-circuited loop occupies a comparatively small space in the armature slots thereby facilitating a maximum number of turns without increasing the size of the armature.

With the foregoing in mind, it is an object of the present invention to provide a new and improved rotor assembly for an armature which effectively eliminates the danger of "runaway" or "overspeeding" and yet preserves the desired high starting torque characteristic thereby precluding objectionable noises and damage to the motor under little or no-load conditions.

A further object of the present invention is to provide a motor apparatus incorporating speed control means in accordance with the present invention which is of comparatively simplified construction whereby the apparatus may be assembled easily, manufactured economically and which is very effective for the purposes intended.

Another object of the present invention is to provide a new and improved method for fabricating in an economical manner an armature incorporating speed control means.

These and other objects of the present invention and the various features and details of the construction and operation thereof are more fully set forth with reference to the accompanying drawings, wherein:

FIG. 1 is a side elevational view of an armature constructed in accordance with the present invention;

FIG. 2 is an enlarged sectional view taken on line 2—2 of FIG. 1; and

FIG. 3 is a fragmentary perspective view of the core structure showing the arrangement of short-circuited turns on the core structure.

Referring now to the drawings, there is shown in FIG. 1 an armature 10 for a motor apparatus, such as a series wound D.C. motor which embodies speed control means in accordance with the present invention. The armature comprises a rotor assembly 12 mounted on a shaft 14.

The rotor assembly 12 consists of a laminated core structure comprised of a plurality of thin laminations or plates 16, each having a plurality of radially extending, circumferentially spaced T-shaped fingers 18. The fingers 18 of the laminations of the core structure are aligned in rows R to provide a plurality of axially extending slots 20 between the rows R, to receive the armature windings 22.

It has been found that when the armature 10 rotates in a magnetic field in a motor assembly, a voltage is induced in the laminations 16 of the rotor assembly which results in a current flow within each lamination 16 and from lamination to lamination. This induced current flow produces a magnetic field opposing the normal magnetic field of the armature windings 22 which causes the armature to rotate thus tending to slow the motor. The amount of induced current flow in the laminations 16 of the rotor assembly is directly proportional to the speed at which the armature 10 rotates and hence the slowing action becomes higher at higher speeds. However, even though the laminations are mounted in close face-to-face relation, there is a comparatively poor electrical contact between the laminations due, for example, to small particles therebetween and surface irregularities between confronting surfaces of adjacent laminations. Accordingly the magnetic field produced by the induced current flow in the laminations 16 is comparatively weak and does not appreciably affect the normal magnetic field of the armature windings 22 and actually does not slow down the motor. Thus under small or no-load conditions, the motor has a tendency to "overspeed" or "runaway."

In accordance with the present invention, means is provided for inducing a flow of current in the rotor assembly providing a magnetic field opposing the normal magnetic field of the armature windings 22, which not only increases proportionately with increased armature speeds, but is of a sufficient magnitude at high armature speeds to prevent "runaway." Accordingly, an effective speed control of the armature is provided by the induced magnetic field, the maximum control occurring at higher speeds of the armature where the danger of "runaway" or "overspeeding" exists. The magnetic field of the induced current is minimal at the lower speeds of the armature to preserve the high stall or starting torque characteristics of the motor. To this end an elongated filamentary current conducting member in the form of a wire 30 made of a material having a high electrical conductivity, is wound about the core structure of the rotor assembly to provide at least one short-circuited loop L around at least one of the rows R of fingers of the core structure and which is disposed at the bottom of the U-shaped slots 20 adjacent the hub of the core structure. In the illustrated form of the invention, the wire 30 is a single, continuous strand which is wound onto the core structure in the pattern shown so that each turn of the wire around the core structure spans three rows of fingers as shown at S and providing a plurality of cross over points 32 at opposite axial end faces of the core structure and a plurality of cross over points 34 in each of the slots. This winding arrangement provides a continuous short-circuited turn or electrically closed loop L around each of the rows R of fingers of the core structure. Accordingly, a plurality of low resistance paths are formed to effect a high induced current flow during rotation of the armature to provide a magnetic field of sufficient magnitude to prevent "overspeeding." In the present instance the wire 30 is bare or uninsulated and the armature windings 22 are insulated wires.

In accordance with the present method of assembling the armature, the laminations 16 are pressed onto the shaft with the fingers 18 aligned in rows R to define the axial slots 20 between the rows. Thereafter the wire 30 is wound onto the core structure to form the pattern shown and provide the plurality of short-circuited loops L around each of the rows R of fingers of the core structure. The armature windings 22 are then wound onto the core structure over the wire 30 thereby seating the wire 30 in place without the need for internal or external fastening means and also insuring good contact at the cross over points 32 and 34. It is noted that the wire 30 and armature windings 22 may be wound onto the core structure by the same winding apparatus, thereby providing a very economical manner of making the armature in a single operation.

By this arrangement, when the armature 10 rotates in a magnetic field, a current is induced in the various short-circuited loops L which produces a magnetic field opposing the normal magnetic field of the armature windings 22, the induced magnetic field being directly proportional to the armature speed and serving to slow down the armature at higher speeds. The effect of the induced magnetic field is of a sufficient magnitude to prevent "runaway" or "overspeeding" at high armature speeds and is minimal at the lower armature speeds to preserve the desired high stall or starting torque characteristics of the motor. It is noted that the symmetrical pattern of the wire 30 on the core structure and location thereof near the center of the core structure provides a mechanically balanced armature assembly which is highly desirable.

The induced current flow slowing down the armature at higher speeds provided by the short-circuited turns or loops L may also be employed advantageously in applications where a motor apparatus is required to provide dynamic braking. The dynamic braking referred to is provided by the current generated within the motor apparatus as the armature turns in the absence of externally applied armature current, which tends to arrest turning of the armature. In the present instance, the current flow in the short-circuited turns or loops L tends to increase the rate of deceleration of the armature thus providing dynamic braking. In this regard it is of course to be understood that when used to effect dynamic braking, the short-circuited wire arrangement may be used in motors other than direct current, series wound motors.

While a particular embodiment of the present invention has been illustrated and described herein, it is not intended to limit the invention and changes and modifications may be made therein within the scope of the following claims.

I claim:

1. A rotor assembly for an armature comprising a core structure, an elongated filamentary element on said core structure, said filamentary element being made of an electrically conductive material and being crossed over itself at least at one point to provide at least one electrically closed loop and an armature winding wrapped around said core structure and said filamentary element to hold the same in place on said core structure and covering at least said cross over point.

2. A rotor assembly for an armature comprising a core structure including a plurality of laminations each having a plurality of spaced apart fingers, said laminations arranged in face-to-face relation with the fingers aligned in rows to define a plurality of slots between said rows extending transversely of the laminations, an elongated filamentary element of electrically conductive material on said core structure having a portion disposed in at least one of said slots and crossed over on itself at least at one point to provide at least one electrically closed loop and an armature winding in said slots around said core structure and said filamentary element to hold said filamentary element in place on the core structure.

3. A rotor assembly for an armature comprising a core structure including a plurality of laminations each having a plurality of radially extending circumferentially spaced fingers, said laminations arranged in face-to-face relation with the fingers aligned in rows to define a plurality of slots between said rows extending transversely of the laminations, an elongated filamentary element of electrically conductive material wound about said core structure and crossed over on itself at least at one point to provide at least one electrically closed loop in the slots surrounding at least one row of fingers remote from the free end portions of the fingers and an armature winding in said slots holding said filamentary element in place.

4. A rotor assembly for an armature comprising a core structure, an elongated filamentary element on said core structure, said filamentary element being an uninsulated wire of a metal having high electrical conductivity and being crossed over on itself at one point to provide at least one electrically closed loop, and an armature winding of insulated wire around said core structure and said filamentary element to hold the same in place on said core structure.

References Cited by the Examiner

UNITED STATES PATENTS

| | | | |
|---|---|---|---|
| 1,371,233 | 3/1921 | Fries | 310—211 |
| 1,621,937 | 3/1927 | Lee | 310—183 |
| 1,743,818 | 1/1930 | Hansen et al. | 310—211 X |
| 1,872,371 | 8/1932 | Weichsel | 310—211 X |
| 2,884,549 | 4/1959 | Hallidy | 310—183 |
| 2,971,106 | 2/1961 | Westphalen | 310—211 X |

ORIS L. RADER, *Primary Examiner.*

MILTON O. HIRSHFIELD, *Examiner.*

J. J. SWARTZ, *Assistant Examiner.*